(12) United States Patent
Vilekar et al.

(10) Patent No.: US 10,411,281 B1
(45) Date of Patent: Sep. 10, 2019

(54) THERMALLY INTEGRATED SOLID OXIDE FUEL CELL SYSTEM

(71) Applicant: Precision Combustion, Inc., North Haven, CT (US)

(72) Inventors: Saurabh Vilekar, Woodbridge, CT (US); Subir Roychoudhury, Madison, CT (US); Christian Junaedi, Cheshire, CT (US); Richard Mastanduno, Milford, CT (US)

(73) Assignee: PRECISION COMBUSTION, INC., North Haven, CT (US)

( * ) Notice: Subject to any disclaimer, the term of this patent is extended or adjusted under 35 U.S.C. 154(b) by 54 days.

(21) Appl. No.: 15/894,016

(22) Filed: Feb. 12, 2018

Related U.S. Application Data

(60) Provisional application No. 62/462,980, filed on Feb. 24, 2017.

(51) Int. Cl.
| | | |
|---|---|---|
| *H01M 8/04007* | (2016.01) | |
| *H01M 8/04014* | (2016.01) | |
| *H01M 8/0612* | (2016.01) | |
| *H01M 8/1246* | (2016.01) | |
| *H01M 8/2425* | (2016.01) | |

(Continued)

(52) U.S. Cl.
CPC ....... *H01M 8/0618* (2013.01); *B01J 19/2415* (2013.01); *C01B 3/40* (2013.01); *H01M 8/04014* (2013.01); *H01M 8/1246* (2013.01); *H01M 8/2425* (2013.01); *B01J 2219/00081* (2013.01); *B01J 2219/24* (2013.01); *C01B 2203/0233* (2013.01); *C01B 2203/066* (2013.01); *C01B 2203/1023* (2013.01);
(Continued)

(58) Field of Classification Search
CPC ............. H01M 8/0618; H01M 8/1246; H01M 8/2425; H01M 8/04007; H01M 8/04014; H01M 8/04022; H01M 2008/1293; C01B 3/40; C01B 2203/0233; C01B 2203/066; C01B 2203/1047; C01B 2203/1023; B01J 19/2415; B01J 22/00081; B01J 2219/24
See application file for complete search history.

(56) References Cited

U.S. PATENT DOCUMENTS

| | | | |
|---|---|---|---|
| 5,051,241 A | 9/1991 | Pfefferle | |
| 5,340,664 A * | 8/1994 | Hartvigsen | ............. F28D 7/103 429/423 |

(Continued)

FOREIGN PATENT DOCUMENTS

| | | |
|---|---|---|
| EP | 1202366 A2 | 5/2002 |
| EP | 1620909 B1 | 11/2012 |

*Primary Examiner* — Carlos Barcena
(74) *Attorney, Agent, or Firm* — Marie F. Zuckerman; Andrew Gathy (57) ABSTRACT

This invention pertains to a thermally-integrated solid oxide fuel cell system, providing for a solid oxide fuel cell stack disposed within a stack hotbox; a heat extractor disposed within the stack hotbox in thermal communication with the fuel cell stack and circumscribed around a full or partial perimeter of the fuel cell stack; a fuel reformer-combustor module disposed within the stack hotbox in thermal communication with the stack and disposed around a full or partial perimeter of the heat extractor; and a manifold fluidly connecting an outlet of the heat extractor to an inlet of a reformer section of the fuel reformer-combustor module.

17 Claims, 4 Drawing Sheets

(51) Int. Cl.
 *C01B 3/40* (2006.01)
 *B01J 19/24* (2006.01)
 *H01M 8/124* (2016.01)

(52) U.S. Cl.
 CPC ............... *C01B 2203/1047* (2013.01); *H01M 2008/1293* (2013.01)

(56) References Cited

U.S. PATENT DOCUMENTS

| | | |
|---|---|---|
| 5,763,114 A | 6/1998 | Khandkar |
| 6,156,444 A | 12/2000 | Smith |
| 6,326,095 B1 | 12/2001 | Kneidel |
| 6,328,936 B1 | 12/2001 | Roychoudhury |
| 6,641,625 B1 | 11/2003 | Clawson |
| 6,746,657 B2 | 6/2004 | Castaldi |
| 6,793,698 B1 | 9/2004 | Sanger |
| 6,835,354 B2 | 12/2004 | Woods |
| 6,986,797 B1 | 1/2006 | Clawson |
| 7,066,973 B1 | 6/2006 | Bentley |
| 7,141,092 B1 | 11/2006 | Roychoudhury |
| 7,524,572 B2 | 4/2009 | Venkataraman |
| 7,976,594 B2 | 6/2011 | Roychoudhury |
| 8,444,951 B2 | 5/2013 | Roychoudhury |
| 2002/0152681 A1 | 10/2002 | Oh |
| 2003/0061764 A1 | 4/2003 | Benallal |
| 2005/0164051 A1* | 7/2005 | Venkataraman ....... B01J 8/0257 429/410 |
| 2010/0062298 A1* | 3/2010 | Valensa ............. H01M 8/04007 429/425 |
| 2011/0061299 A1 | 3/2011 | Roychoudhury |

\* cited by examiner

THERMALLY INTEGRATED SOLID OXIDE FUEL CELL SYSTEM

CROSS REFERENCE TO RELATED APPLICATION

This application claims the benefit of U.S. Provisional Application No. 62/462,980, filed Feb. 24, 2017.

GOVERNMENT RIGHTS

This invention was made with support from the U.S. government under U.S. Contract No. N00014-13-P-1077, sponsored by the Department of Defense. The U.S. Government holds certain rights in this invention.

FIELD OF THE INVENTION

This invention pertains to a thermally integrated solid oxide fuel cell system constructed of components including a solid oxide fuel cell stack, a fuel reformer, and a combustor.

BACKGROUND OF THE INVENTION

A solid oxide fuel cell (SOFC) stack operating at high temperatures of about 550° C. to 850° C. provides an overall fuel to electric efficiency of about 40 to 50 percent, which results in a significant production of excess or waste heat. As known in the art, the term "SOFC stack" refers to a structure comprising a plurality of individual solid oxide fuel cell repeat units electrically connected in series. Each individual solid oxide fuel cell repeat unit comprises an oxygen electrode (cathode) wherein oxygen is reduced with a flow of electrons to oxide ions; a solid oxide electrolyte which transports oxide ions so produced from the cathode to a fuel electrode; the fuel electrode (anode) wherein a fuel, such as hydrogen and/or carbon monoxide, and the oxide ions are contacted to produce water and/or carbon dioxide, respectively, with concomitant production of electrons; and an external electrical circuit which collects the electrons so produced and delivers them to the cathode while also being available for useful work. In SOFC systems at least one stack is disposed within a structural housing referred to as a "stack hotbox". Efficiently recuperating waste or excess heat from the environs around the stack as defined within the stack hotbox would enable higher fuel to electric efficiency.

The SOFC stack operates on a fuel source typically comprising hydrogen, carbon monoxide, or a mixture thereof. Hydrogen and carbon monoxide can be supplied to the stack via a steam reformer (SR) wherein a hydrocarbon fuel, such as natural gas or methane or diesel, is contacted with steam and converted in an endothermic process into a synthesis gas (syngas) comprising a mixture of hydrogen and carbon monoxide and lesser quantities of carbon dioxide and water. Alternatively, an autothermal reformer (ATR) can be employed in place of the steam reformer. In autothermal reforming, the hydrocarbon fuel is contacted with steam and an oxidant, typically air or oxygen, and converted in an exothermic process into a synthesis gas composition typically containing lower concentrations of hydrogen and carbon monoxide, as compared with syngas derived from steam reforming.

Generally, not more than about 75 percent of the synthesis gas fuel passing through the SOFC stack is utilized. An anode tail gas exiting an anode side of the stack comprises the non-utilized hydrogen and carbon monoxide as well as additional quantities of water and carbon dioxide, the additional water and carbon dioxide having been created at the anode in the fuel cell electrochemical process. The anode tail gas can be recycled to a combustor and fully combusted to carbon dioxide and water with release of exothermic heat. This exotherm from the combustor can be recuperated and utilized to drive the endothermic steam reformer.

Several advantages are achievable if the excess or waste heat radiating from the SOFC stack could be removed from the environs of the stack and utilized in a productive manner. Actively removing the waste heat from the stack would lower the temperature of the stack hotbox, which in turn would beneficially result in slower degradation and improved durability of the individual solid oxide fuel cell repeat units forming the stack. Likewise, a lower temperature of the stack hotbox would advantageously lower requirements for cathode air flow into the SOFC due to reduced cooling needs, which has the advantage of reducing pressure on seals, pumping loads, and system parasitics. Moreover, it would be advantageous to achieve a fuel utilization of greater than about 80 percent in the stack with complementary removal of increased heat. Any improvement in stack fuel utilization, however, is tied to improved thermal management of the fuel reforming.

In view of the above, a need exists in the art for an improved SOFC system in which a fuel reformer is thermally integrated with a SOFC stack in a manner that advantageously enhances thermal efficiency of the reformer while simultaneously increasing the fuel utilization of the stack, and without compromising durability and without unduly increasing system complexity. More importantly, an integrated system would result in an improvement in overall SOFC system efficiency, as defined hereinafter.

SUMMARY OF THE INVENTION

This invention provides for a thermally integrated solid oxide fuel cell system comprising:
(a) a solid oxide fuel cell stack disposed within a stack hotbox;
(b) a heat extractor disposed within the stack hotbox in thermal communication with the fuel cell stack, the heat extractor comprising a flow path from an inlet to an outlet, the flow path of the heat extractor being circumscribed around a full or partial perimeter of the fuel cell stack;
(c) a fuel reformer-combustor module disposed within the stack hotbox in thermal communication with the fuel cell stack, the module being circumscribed around a full or partial perimeter of the flow path of the heat extractor;
(d) a manifold providing fluid communication from the outlet of the heat extractor to an inlet of a fuel reformer section of the fuel reformer-combustor module.

The solid oxide fuel cell system of this invention thermally integrates a solid oxide fuel cell stack with a heat extractor, a fuel reformer, and a combustor in a unique structural design within a stack hotbox, thereby offering improved efficiencies of function. In particular, in certain embodiments the efficiency of the fuel reformer is increased. More generally, the fuel-to-electric efficiency of the SOFC stack is increased; and the overall SOFC system efficiency is increased, as explained in detail hereinafter.

DETAILED DESCRIPTION OF THE INVENTION

For clarity, certain terms related to efficiency are defined as used in the context of this invention. The term "efficiency of the fuel reformer" is defined as a ratio, expressed as a percentage, of a total Lower Heating Value (LHV) of a gaseous reformate actually obtained from the reformer (i.e., sum of the LHV's of all gaseous components identified in the reformate including hydrogen, carbon monoxide, and unconverted fuel), as compared with a LHV of the hydrocarbon fuel fed to the reformer. The term "Lower Heating Value" (or net calorific value) of the gaseous reformate is defined as the amount of heat released by combusting a specified composition and quantity of gaseous reformate initially at 25° C. to full combustion products ($CO_2$ and $H_2O$), and returning the temperature of the combustion products to 150° C., which assumes a latent heat of vaporization of water in the reaction products is not recovered. The skilled person will recognize that at "equilibrium" a rate of forward reaction converting hydrocarbon fuel to reformate equals a rate of reverse reaction converting reformate to hydrocarbon fuel. The distribution of reformate products in the reforming process is equilibrium driven and is a function of operating conditions. The maximum LHV of the gaseous reformate is determined by equilibrium calculations via minimization of Gibbs free energy function, but will ordinarily be less than the LHV of the hydrocarbon fuel fed to the reformer.

With reference to the SOFC stack, the term "fuel-to-electric efficiency" is defined herein as electrical power output of the stack relative to the LHV of the reformate fed to the stack as fuel.

With reference to this invention, the term "overall SOFC system efficiency" is defined as electrical power output of the stack relative to the LHV of the hydrocarbon fuel fed to the system, more specifically, fed to the fuel reformer inasmuch as the hydrocarbon fuel feeds into the reformer.

With further reference to this invention, the terms "tube" or "tubular" as used hereinafter refer to an elongated hollow body defining a flow path. The hollow body can have any appropriate cross-sectional shape including, in one exemplary embodiment, a circular shape, and in another exemplary embodiment, a rectangular shape.

In one preferred embodiment, this invention provides for a thermally-integrated solid oxide fuel cell system comprising:
(a) a solid oxide fuel cell stack disposed within a stack hotbox;
(b) one or more heat extractor tubes disposed within the stack hotbox in thermal communication with the fuel cell stack, the one or more heat extractor tubes having a flow path from an inlet to an outlet, the one or more heat extractor tubes being circumscribed around a full or partial perimeter of the fuel cell stack;
(c) a steam reformer-combustor module disposed within the stack hotbox in thermal communication with the fuel cell stack and circumscribed around a full or partial perimeter of the heat extractor tubes; the steam reformer-combustor module comprising a shell-and-tube reactor wherein a first tube having a first flow path from a first inlet to a first outlet is nested in concentric arrangement within a second tube of larger diameter having a second flow path from a second inlet to a second outlet, the second flow path comprising an annular space between an inner wall of the second tube and an outer wall of the first tube; and
(d) a manifold providing fluid communication from the outlet of the heat extractor to an inlet of a fuel reformer section of the fuel reformer-combustor module.

In a first more specific embodiment of the aforementioned apparatus, the fuel reformer-combustor module further comprises: (i) the first tube (that is, the inner tube) comprises a reforming zone defining a volume within the first tube; (ii) the second tube (that is, the outer tube) comprises a combustion zone defining the annular space between an inner wall of the second tube and an outer wall of the first tube; and (iii) the manifold provides a flow path from the outlet of the heat extractor to the first inlet of the first tube, thereby connecting the flow path of the heat extractor to the reforming zone.

In a second more specific embodiment of the aforementioned apparatus, the fuel reformer-combustor module further comprises: (i) the first tube (that is, the inner tube) comprises a combustion zone defining a volume within the first tube; (ii) the second tube (that is, the outer tube) comprises a reforming zone defining the annular space between the inner wall of the second tube and the outer wall of the first tube; and (iii) the manifold provides a flow path from the outlet of the heat extractor to the second inlet of the second tube, thereby connecting the flow path of the heat extractor to the reforming zone.

In yet another embodiment, a reforming catalyst is disposed within the reforming zone, the reforming catalyst comprising a mesh substrate having an ultra-short-channel-length and having a Group VIII metal deposited thereon.

Figure 1:
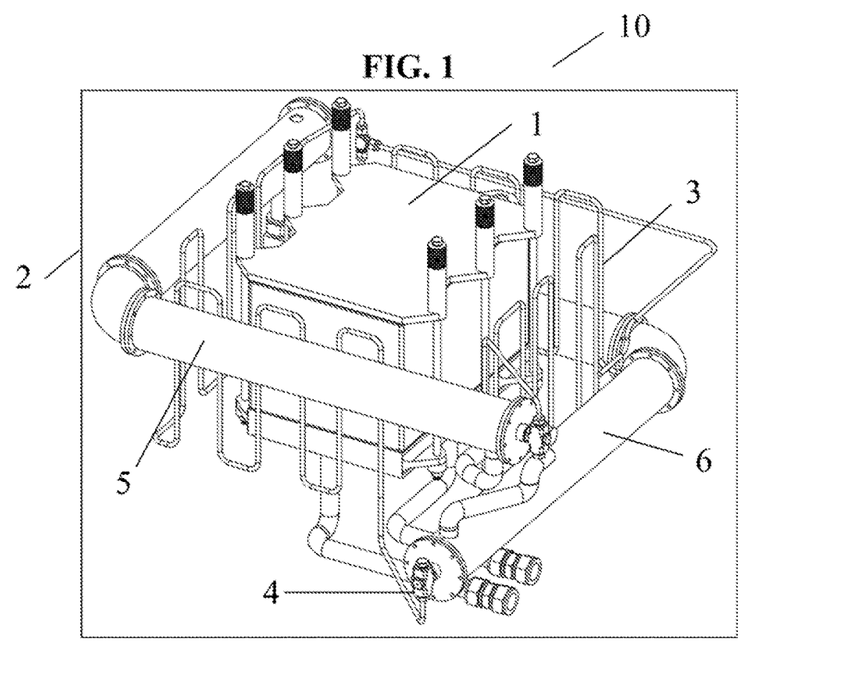
FIG. 1 depicts an illustration of an embodiment of the SOFC system of this invention having thermally integrated therein a solid oxide fuel cell stack, a heat extractor, and a fuel reformer-combustor module.

Reference is made to FIG. 1 illustrating an embodiment (10) of the SOFC system of this invention having depicted in isometric view component parts including a solid oxide fuel cell stack (1), a heat extractor (3), and a reformer-combustor module (5/6) and, depicted in transverse view for clarity of illustration, a hotbox (2). As seen in FIG. 1, the solid oxide fuel cell stack (1), which is shown in bulk cubic configuration, but comprised of a plurality of individual solid oxide fuel cell repeat units electrically connected in series, is disposed entirely within the stack hotbox (2). The heat extractor (3) is provided in the form of a continuous tube disposed within the stack hotbox (2) in thermal communication with the SOFC stack (1). As illustrated, the heat extractor (3) is disposed adjacent to the stack (1) so as to capture radiant and convective heat from the stack (1). In this embodiment, the heat extractor (3) does not physically touch the stack (1), but rather is positioned in close proximity and spaced-apart relation to the stack. More specifically as seen in FIG. 1, the tube defining the heat extractor (3) is configured in a vertically-oriented, wave-like form that is circumscribed around the entire perimeter of the stack (1), so as to maximize capture of heat released from four sides of the stack (1). In this embodiment, the bottom side of the stack is not covered by the heat extractor tube, so as to make space available for conduits passing fluids into and out of the stack. The fuel reformer-combustor module (5/6) is also disposed within the stack hotbox (2) in thermal communication with the SOFC stack (1). More specifically, the fuel reformer-combustor module (5/6) is provided as two L-shaped sections (5 and 6); each L-shaped section providing a reformer-combustor combination circumscribed in close proximity but spaced-apart relation around two sides of the heat extractor (3). The placement of the fuel reformer-combustor module (5/6) allows for capture of radiant and convective heat emanating from and around the stack (1). The heat extractor (3) is fluidly connected to the fuel reformer-combustor module (section 6) through inlet (4) to the reformer section of the fuel reformer-combustor module (6).

Figure 2:
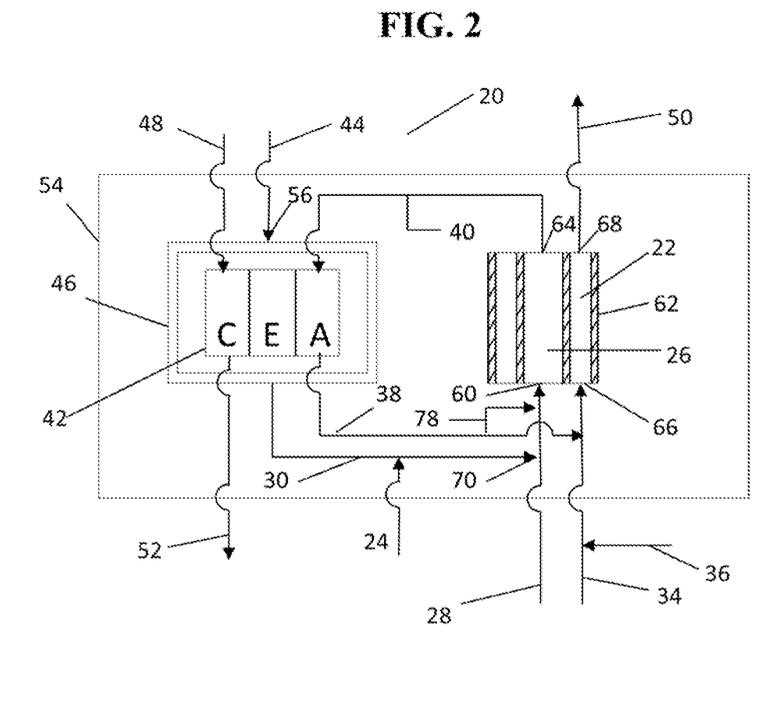
FIG. 2 depicts a schematic of an embodiment of the SOFC system of this invention having thermally integrated therein a solid oxide fuel cell stack, a heat extractor, and a fuel reformer-combustor module having a shell-and-tube structure.

Another exemplary embodiment of the SOFC system of this invention is illustrated in FIG. 2, which offers a more detailed schematic diagram (20) of the apparatus and its related operating process as well as a preferred embodiment of the fuel reformer-combustor module. As illustrated, a SOFC stack (42), a heat extractor (46) and a fuel reformer-combustor module (62) are disposed within a stack hotbox (54). The fuel reformer-combustor module (62) is constructed in a shell-and-tube design from two concentric cylindrical tubes (26/22). Inner tube (26) of smaller diameter functioning as the fuel reformer is fitted with an inlet (60) for feeding a hydrocarbon fuel via fuel line (28) and steam via steam line (30), which feeds into fuel line (28) via inlet (70). The oxidant, if used, is fed via oxidant line (24), which feeds into steam line (30). An interior volume of the reformer (26) is typically loaded with a reforming catalyst (not shown). Steam is derived by heating liquid water fed through water line (44) via inlet (56) into the heat extractor (46), which is in thermal communication with SOFC stack (42). The heat extractor (46) is circumscribed around the perimeter of the stack (42) in spaced apart relation, but of such close proximity as to capture radiant and convective heat from and around the stack (42). The SOFC stack (42) comprises a plurality of solid oxide repeat units, each of which is represented in FIG. 2 (42) as comprising an anode (A), a solid oxide electrolyte (E), and a cathode (C). A gaseous reformate exits the reformer (26) via outlet (64); and a reformate exhaust line (40) feeds the reformate into the anode compartment (A) of the stack (42), with an anode tail gas exiting the anode via line (38). Air or oxygen is fed via line (48) to the cathode side (C) of the SOFC (42), and a cathode exhaust exits via line (52). The combustor/outer tube (22) of the fuel reformer-combustor module (62) receives the anode tail gas via line (38), oxidant via line (36) and, if desired, hydrocarbon fuel via line (34) through inlet (66). The combustor (22) functions to combust the fuels and oxygen provided therein with a combustion exhaust exiting the combustor (22) via outlet (68) and exhaust line (50). Heat generated in the combustor (22) is transferred, via any of conductive, convective, and/or radiant transfer, into the reformer (26) to drive the reforming process. Alternatively, a portion of the anode tail gas in exhaust line (38) can be split off and merged via line (78) into hydrocarbon fuel line (28) feeding into the reformer section (26) of the reformer-combustor module (62). Note that for clarity of illustration, the shell-and-tube reformer-combustor module (62) is disposed on only one side of the heat extractor tube (46) and SOFC stack (42); but the design is optimized for increased thermal integration when the reformer-combustor module (62) circumscribes two sides, three sides, or the entire perimeter of the heat extractor tube (46) and SOFC stack (42). It should be appreciated that the reformer-combustor module (62) is situated in spaced apart relation but close proximity to the heat extractor tube (46) and the stack (42), so as to capture heat from the stack (42) and its environs within the hotbox (54).

Figure 3:
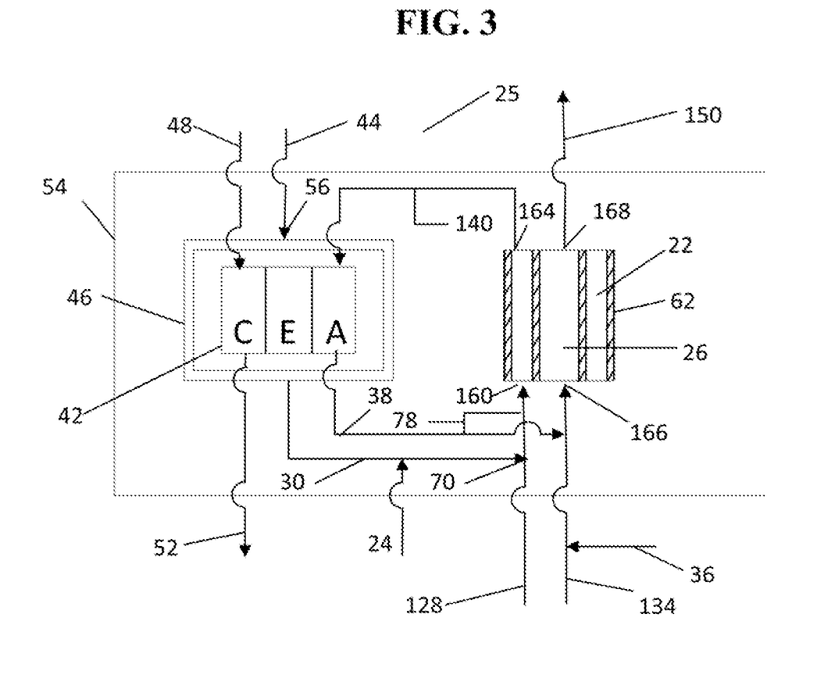
FIG. 3 depicts a schematic of another embodiment of the SOFC system of this invention having thermally integrated therein a solid oxide fuel cell stack, a heat extractor, and a fuel reformer-combustor module having a shell-and-tube structure.

FIG. 3 illustrates yet another exemplary embodiment of the system of this invention (25) similar to the embodiment of FIG. 2, with two exceptions. In FIG. 3, the inner tube (26) of the reformer-combustor module (62) functions as the combustor not the reformer. As such, the anode tail gas line (38) and oxidant line (36) feed into combustor fuel line (134), which is connected via inlet (166) to the inner tube (26). The combustor exhaust exits inner tube (26) via outlet (168) into combustor exhaust line (150). In this embodiment, the annular space between the inner tube (26) and the outer tube (22) functions as the fuel reformer. As such, oxidant line (24) merges into steam line (30), which merges into hydrocarbon fuel line (128), which is fluidly connected via inlet (160) to the annular space between the inner tube (26) and the outer tube (22) of the reformer-combustor module (62). Reformate exits the annular-shaped reformer (22) via outlet (164) into reformate exhaust line (140), which is fed into the anode side (A) of the fuel cell stack (42).

The stack hotbox is not limited by any size or shape, but rather is constructed in any size and shape convenient for housing the various components of the SOFC system of this invention. More importantly, the materials from which the stack hotbox and its related parts (including any inlets, outlets, and conduits associated therewith) are constructed should be capable of withstanding the temperature to which the hotbox and its related parts are exposed, such temperature usually ranging from greater than about 600° C. to less than about 1,000° C. Suitable non-limiting materials of construction for the hotbox inlets, outlets, and conduits associated therewith include, for example, nickel-chromium alloys and nickel-chromium-iron alloys, such as INCONEL®, HASTELLOY®, and HAYNES® brands of alloys. Additionally, the stack hotbox itself is desirably constructed from an insulating material, which substantially retains heat within the hotbox as opposed to thermally passing such heat to environs external to the hotbox. Non-limiting examples of materials suitable for constructing the hotbox include ceramics of acceptable temperature durability.

The SOFC fuel cell stack, as provided in this invention, comprises a plurality of individual solid oxide fuel cell repeat units. Each repeat unit comprises a sandwich assembly having constituent parts in the following order: a fuel electrode (anode), a solid oxide electrolyte, and an oxygen electrode (cathode), the fuel and oxygen electrodes being connected via an external electrical circuit. The solid oxide fuel cell is an apparatus that in forward operation provides for the electrochemical reaction of a stack fuel, namely hydrogen or carbon monoxide, with an oxidant, such as oxygen, to produce a DC electrical current and a chemical product, namely, water or carbon dioxide, respectively. In another embodiment, the stack fuel additionally comprises methane. The stack fuel is fed to the fuel electrode where it reacts via oxidation with oxide ions to produce the oxidized chemical product, i.e., the water and carbon dioxide, and a flow of electrons. The electrons travel via an embedded current collector and the external electrical circuit to the oxygen electrode, where molecular oxygen is reduced to form oxide ions. During transit the electrons are available to do useful work. The oxide ions produced at the oxygen electrode diffuse through the solid oxide electrolyte to the fuel electrode to complete the chemical reaction.

The art describes many embodiments of solid oxide fuel cell repeat units, any of which is suitably employed in this invention. As a non-limiting exemplary embodiment, the solid oxide electrolyte comprises a ceramic that is a good conductor of oxide ions but a poor or nonconductor of electrons, which ensures that the electrons pass through the external circuit. As a non-limiting exemplary embodiment, the solid oxide electrolyte is constructed of a ceramic comprising a yttria-stabilized zirconia (YSZ) sandwiched in between a fuel electrode comprised of a nickel oxide/YSZ cermet and an oxygen electrode comprised of a doped lanthanum manganite. This is only one suitable design, however, which should not limit the invention in any manner.

It should be appreciated that an anode tail gas exits the SOFC at an outlet of the anode compartment, the tail gas comprising, in addition to water and carbon dioxide, any unreacted hydrogen and carbon monoxide. In one exemplary embodiment applied to this invention, the anode tail gas or a portion thereof is recycled to the combustor and combusted to generate heat, which is recuperated and utilized to drive the endothermic reforming reaction. In another exemplary embodiment, the anode tail gas or a portion of thereof is recycled to the reformer, thereby minimizing water needs of the reformer, increasing the hydrogen content in the reformate stream, and concomitantly increasing the system efficiency. In yet another exemplary embodiment, the anode tail gas is split into two flows, one of which is fed to the reformer and the other of which is fed to the combustor.

Since each individual SOFC repeat unit produces only a small, generally low voltage, typically a large number of individual fuel cell repeat units is connected in series to form the SOFC stack for the purpose of achieving a higher voltage and current. Each stack includes interconnects that connect the fuel electrodes and oxygen electrodes in adjacent cells thereby collecting the current from each cell and delivering the collected currents to the external circuit. The stack also includes bipolar plates, which separate the individual fuel cells from each other as well as flow manifolds that deliver and distribute the flows of fuel and oxygen to their respective electrodes within the stack and remove products from the stack.

It should be appreciated that the SOFC stack employed in this invention is not limited by any size or shape. Typically, the SOFC stack is provided as a tower having a transverse cross-section of square or rectangular shape. In this invention, under operating conditions at high temperatures, the stack radiates heat from all sides thereby raising the temperature of the environs around the stack within the stack hotbox. Strategic placement of the heat extractor and reformer-combustor module takes advantage of the radiant and convective heat available within the stack hotbox. The hotbox is not limited to one SOFC stack. If desired, more than one SOFC stack can be positioned within the hotbox.

The heat extractor including its flow path from inlet to outlet is constructed from any material capable of withstanding the temperature to which the heat extractor is exposed. The material is required to be essentially non-reactive towards water and steam and also thermally conductive, that is, capable of capturing heat from the stack and its environs. Suitable non-limiting materials of construction for the heat extractor include, for example, nickel-chromium alloys and nickel-chromium-iron alloys, such as INCONEL®, HASTELLOY®, and HAYNES® brands of alloys. Under operating conditions water or low temperature steam is passed through the flow path of the heat extractor. The extractor functions are to capture waste heat from the SOFC stack and to transfer the captured heat to the flowing water or steam, thereby resulting in generation of steam or super-heated steam, respectively, for use in the fuel reformer. Since water and steam have a high heat capacity, excess heat is efficiently removed in this manner from the stack. The steam so produced is fed into the fuel reformer, thereby recuperating excess stack heat to drive the reforming process while simultaneously reducing the burden of external heat generated in the combustor for driving the endothermic reformer.

The heat extractor is not limited by size or shape. In one exemplary embodiment, the heat extractor is provided as a tube with an inlet and an outlet, or a plurality of tubes connected into a group having a collective inlet and outlet. In one embodiment, the heat extractor in any configuration, tubular or otherwise, circumscribes the entire perimeter of the fuel cell stack and is disposed in thermal communication but spaced apart relation to the stack, thereby permitting optimal capture of excess stack heat. This design results in a uniform temperature distribution around the stack, while allowing stack seals to maintain an advantageously reduced temperature. In a second embodiment, the heat extractor circumscribes a partial perimeter of the fuel cell stack, for example, all sides of the stack except for a manifolding side comprising inlet and outlet conduits to the SOFC stack itself.

Preferably, the heat extractor is wrapped around the stack, essentially cloaking its sides in a serpentine fashion so as to maximize capturing waste heat. As an exemplary embodiment, the heat extractor comprises, as illustrated in FIG. 1, a continuous tube configured in a vertically-oriented, wave-like form that is circumscribed in serpentine fashion around the entire perimeter of the stack. In another exemplary embodiment, the heat extractor is tubular and wrapped in a spiral configuration around the perimeter, essentially along the entire vertical length of the stack. Another exemplary embodiment provides for the heat extractor tube to cover only a portion of the stack exterior surface, the remaining portion of the surface being made available for a manifold of inlets and outlets providing access into and out of the stack. In yet another exemplary embodiment, a plurality of heat extractor tubes are provided, connected in series or parallel, such that a grouping of tubes covers the desired surface area of the stack. In yet another exemplary embodiment, the heat extractor contacts the solid oxide fuel cell stack. In yet another embodiment, as illustrated in FIGS. 2 and 3, the heat extractor does not actually physically contact the stack, but rather is positioned in thermal communication, in spaced-apart relation proximate to the stack.

For larger systems comprising a plurality of SOFC stacks disposed within one stack hotbox, a heat extractor is desirably circumscribed around each individual stack as noted above. Such an arrangement helps to maintain a closely similar temperature profile around each stack. Moreover, each stack should then maintain a similar electrical power ensuring improved balanced load distribution and improved lifetime for the entire SOFC system.

In the unique design of this invention, the fuel reformer, which comprises one part of the fuel reformer-combustor module, is disposed inside the stack hotbox and circumscribed around the partial or full perimeter of the heat extractor, typically, in spaced apart relation to the heat extractor. From placement within the stack hotbox, the reformer also benefits from being in thermal communication around the full or partial perimeter of the stack itself. In this manner, the fuel reformer captures excess stack heat, for example, via radiation and convection. The fuel reformer is adapted with an inlet to input a hydrocarbon fuel, an inlet to input steam, and optionally an inlet to input an oxidant, preferably air or oxygen. In the case of a liquid hydrocarbon fuel, it is desirable to atomize the fuel so as to minimize coke formation within the reformer. In one embodiment, an external atomizer is disposed outside the hotbox, and a conduit for feeding an atomized liquid fuel is provided from the external atomizer to the fuel inlet of the reformer within the hotbox. In another embodiment, an atomizer is located within the hotbox, preferably, as a component of the fuel reformer such that under operating conditions the liquid fuel is atomized and vaporized utilizing excess heat from the stack.

In one embodiment, the fuel reformer operates on a mixture predominantly comprising hydrocarbon fuel and steam with little or no oxidant in an endothermic steam reforming process, as described in detail hereinafter. The combustor is integrated with the reformer in the fuel reformer-combustor module, for the purpose of combusting a separate input of hydrocarbon fuel or combusting an anode tail gas derived from the fuel cell stack, so as to provide heat via combustion to drive in this embodiment the endothermic steam reforming process. Generally, the combustor provides a primary source of heat to the reformer; whereas heat from the stack provides a secondary source of heat to the reformer, due to positioning the reformer within the hotbox as well as capturing excess stack heat in the heat extractor tubes to produce or heat steam for the reformer. This embodiment beneficially allows high stack fuel utilization, which results in an anode tail gas that is depleted in heat content and is not entirely sufficient to drive the endothermic steam reformer by itself. Excess stack heat of the secondary heat source for the reformer provides the thermal balance in such cases. In another embodiment, the combustor is fed with the separate input of hydrocarbon fuel, if needed, to balance overall system requirements, for example, when the stack is operating during startup or at high fuel utilization, typically greater than about 80 percent fuel utilization. The combustor also functions as a start-up burner providing heat for raising the system components to their desired operation temperature(s), particularly, as pertains to the reforming catalyst and the stack itself. Thus, the combustor is utilized during start-up, transients and steady state operation, as desired.

In another embodiment, the fuel reformer operates on supplies of a hydrocarbon fuel, oxidant, and optionally steam in either a catalytic partial oxidation (CPDX) or an autothermal reforming (ATR) process. Both of these processes function exothermically with release of heat. By cycling excess stack heat to the CPDX or ATR process via radiation and convection as well through steam generation in the heat extractor, the oxidant requirement of the CPDX or ATR process is reduced. This advantageously results in an increased thermal efficiency of the fuel reformer and a reduced dilution of the reformate stream exiting the reformer. As another option, the fuel reformer can be operated under CPDX or ATR conditions during a start-up phase of the solid oxide fuel cell system. During the start-up phase, the temperature of all components including the fuel cell stack and the reforming catalyst must be raised to steady-state operating temperatures. Thus, the exothermic nature of CPDX and ATR operation provides heat to cold-start the system components. After steady-state temperatures are reached, the fuel reformer is advantageously converted to endothermic steam reforming status, wherein heat generated by the stack is recuperated for use in the heat extractor and the reformer. The combustor, which is needed during endothermic steam reforming, can also be utilized to generate heat during start-up.

Figure 4:
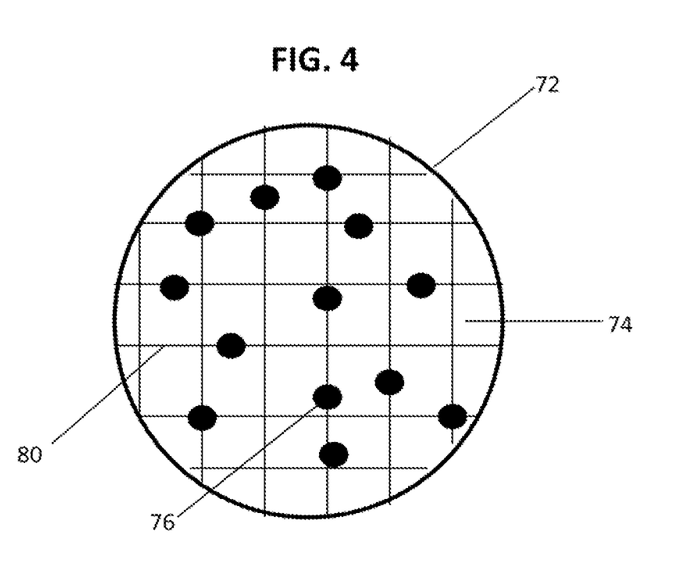
FIG. 4 illustrates an embodiment of a mesh substrate having a catalyst supported thereon, which is employed in the fuel reformer section of the fuel reformer-combustor module of the SOFC system of this invention.

The fuel reformer comprises a catalytic reaction zone having disposed therein a substrate onto which a reforming catalyst is supported. Non-limiting examples of suitable substrates include powders, pellets, extrudates, foams, and meshes. In one advantageous embodiment, the substrate is provided as a mesh constructed in the form of a reticulated net or screen comprising a plurality of pores, cells, or channels having an ultra-short-channel-length, as defined hereinafter. FIG. 4 depicts in cross-sectional view one sheet of mesh substrate (72) comprising an array of struts (80) and a plurality of void volumes (74), the struts having supported thereon particles of catalyst (76). In one embodiment, the mesh is provided in a coiled configuration of cylindrical shape having an inner diameter and a larger outer diameter such that reactants flowing there through move along a radial flow path from an inlet along the inner diameter to an outlet along the outer diameter. In another embodiment, the mesh is provided as a stack of sheets with an inlet at one end of the stack and an outlet at an opposite end of the stack. In any configuration the bulk configuration of the mesh provides for a plurality of void volumes in random order, that is, empty spaces having essentially no regularity along the flow path from inlet to outlet. The mesh substrate is suitably provided as a metal mesh, a ceramic mesh, or a combination thereof as in a cermet.

In more specific embodiments, the metal mesh substrate is constructed from any conductive metal or combination of metals provided that the resulting structure is capable of withstanding the temperatures and chemical environment to which it is exposed. Suitable non-limiting materials of construction for the metal mesh include iron-chromium alloys, iron-chromium-aluminum alloys, and iron-chromium-nickel alloys. Such metal meshes are available commercially, for example, from Alpha Aesar and Petro Wire & Steel. In one exemplary embodiment, the metal mesh comprises a Microlith® brand metal mesh obtainable from Precision Combustion, Inc., of North Haven, Conn., USA. As described in U.S. Pat. Nos. 5,051,241 and 6,156,444, incorporated herein by reference, Microlith® brand mesh technology offers a unique design combining an ultra-short-channel-length with low thermal mass in one monolith, which contrasts with prior art monoliths having substantially longer channel lengths as noted hereinafter.

With reference to a ceramic mesh substrate, the term "ceramic" refers to inorganic non-metallic solid materials with a prevalent covalent bond, including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing insulating layers of ultra-short-channel-length ceramic mesh comprising woven silica, both patents incorporated herein by reference. With reference to a cermet substrate, the term "cermet" refers to a composite material comprising a ceramic in combination with a metal, the composite being typically conductive while also exhibiting a high resistance to temperature, corrosion, and abrasion in a manner similar to ceramic materials.

The mesh substrate is not limited by any method of manufacture; for example, meshes can be constructed via weaving or welding fibers, or by an expanded metal technique as disclosed in U.S. Pat. No. 6,156,444, incorporated herein by reference, or by 3-D printing, or by a lost polymer skeleton method.

In a preferred embodiment, the substrate comprises the aforementioned MICROLITH® brand mesh of ultra-short-channel-length, available from Precision Combustion, Inc., North Haven, Conn., USA. Generally, the mesh comprises short channel length, low thermal mass metal monoliths, which contrast with prior art monoliths having longer channel lengths. For purposes of this invention, the term "ultra-short-channel-length" refers to a channel length in a range from about 25 microns (μm) (0.001 inch) to about 500 μm (0.02 inch). In contrast, the term "long channels" pertaining to prior art monoliths refers to channel lengths of greater than about 5 mm (0.20 inch) upwards of 127 mm (5 inches). In this invention the term "channel length" is taken as the distance along one pore or channel as measured from an inlet on one side of the mesh sheet to an outlet on another side of the mesh sheet. This measurement is not to be confused with the overall length of flow path through the entire substrate from an inlet at the inner diameter, for example, of the coiled mesh to an outlet at the outer diameter of the coiled mesh. In another embodiment, the length of the pore, cell, or channel is not longer than the diameter of the elements from which the mesh is constructed; thus, the channel length may range from 25 μm (0.001 inch) up to about 100 μm (0.004 inch). Generally, the channel length is not longer than about 350 μm (0.014 inch). In view of this ultra-short channel length, the contact time of reactants with the mesh and catalyst supported thereon advantageously ranges from about 5 milliseconds (5 msec) to about 350 msec. The MICROLITH® brand ultra-short-channel-length mesh typically comprises from about 100 to about 1,000 or more flow channels per square centimeter.

More specifically, each layer of mesh in this invention typically is configured with a plurality of channels or pores having a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1.

The MICROLITH® brand mesh having the ultra-short-channel-length facilitates packing more active surface area into a smaller volume and provides increased reactive area and lower pressure drop, as compared with prior art monolithic substrates. Whereas in prior art honeycomb monoliths having conventional long channels where a fully developed boundary layer is present over a considerable length of the channels; in contrast, the ultra-short-channel-length characteristic of the mesh substrate of this invention avoids boundary layer buildup. Since heat and mass transfer coefficients depend on boundary layer thickness, avoiding boundary layer buildup enhances transport properties. Employing the ultra-short-channel-length mesh, such as the MICROLITH® brand thereof, to control and limit the development of a boundary layer of a fluid passing there through is described in U.S. Pat. No. 7,504,047, which is a Continuation-In-Part of U.S. Pat. No. 6,746,657 to Castaldi, both patents incorporated herein by reference. The preferred MICROLITH® brand mesh of ultra-short-channel-length also advantageously provides for a light-weight portable size, a high throughput, thorough mixing of reactants passing therethrough, a high one-pass yield of hydrogen-containing reformate, a low yield of coke and coke precursors, and an acceptably long catalyst lifetime, as compared with alternative substrates, such as, ceramic monolith and pelleted substrates.

The substrate disposed within the reforming zone of the fuel reformer employed in this invention supports a reforming catalyst, which under operating conditions functions to facilitate steam reforming, catalytic partial oxidation reforming, or autothermal reforming, as desired. A suitable reforming catalyst comprises one or more metals of Group VIII of the Periodic Table of the Elements, including iron, cobalt, nickel, ruthenium, rhodium, palladium, osmium, iridium, platinum, and mixtures thereof. The catalyst chosen depends upon the particular fuel fed to the reformer. Gaseous fuels, such as methane, are suitably reformed with a nickel catalyst as known in the art. Liquid fuels, such as diesel, are suitably reformed with one or a mixture of platinum group metals (PGM, e.g., Ru, Rh, Pd, Os, Ir, Pt. and mixtures thereof). The deposition of catalytic metal(s) onto the metal mesh is implemented by methods well known in the art. Alternatively, finished catalysts comprising catalytic metal(s) supported on the MICROLITH® brand mesh substrate are available from Precision Combustion, Inc., North Haven, Conn.

In another exemplary embodiment, the mesh is constructed of an analogous structure of metal, ceramic, or other manufactured or structured ultra-short-channel-length substrate material comprising an interconnected network of solid struts defining a plurality of pores of an open-cell configuration. The pores can have any shape or diameter; but typically, a number of pores that subtend one inch designate a "pore size," which for most purposes ranges from about 5 to about 80 pores per inch. The relative density of such structures, taken as the density of the structure divided by the density of solid parent material of the struts, typically ranges from about 2 to about 15 percent. Manufactured or structured ultra-short-channel-length substrates are commercially available in a variety of materials capable of withstanding the operating temperatures of the fuel reformer and SOFC of this invention.

The reformer further comprises one or more inlets for feeding to the catalytic reforming zone the hydrocarbon fuel, steam, and optionally an anode tail gas and an oxidant. In yet another feature, the reformer further comprises an outlet for exiting the reformate stream from the reformer, the reformate stream passing through an appropriate manifold into the solid oxide fuel cell stack(s). The inlets and outlets of the reformer are conventional in design and constructed from any suitable material capable of withstanding the temperature and chemicals to which the material is exposed.

As noted hereinbefore, the fuel reformer is one component of a two-component module that also includes a combustor. The combustor functions to burn the hydrocarbon fuel, or the anode tail gas, or a mixture thereof to provide internal heat to drive the reformer. The combustor unit is provided by any conventional flame-stabilized or flameless, catalytic or non-catalytic design, as known in the art. The combustor comprises a housing defining a combustion zone or chamber, one or more inlets for feeding the hydrocarbon fuel, the anode tail gas, or a mixture thereof, and an oxidant into the combustion chamber and an outlet for exiting combustion products. The combustor typically may also include an ignition device. The chamber itself, the inlets and outlet are conventionally constructed from any material of suitable durability in view of the temperature and chemicals to which the combustor is exposed under operating conditions. Suitable non-limiting materials of construction for the combustor include, for example, nickel-chromium alloys and nickel-chromium-iron alloys, such as INCONEL®, HASTELLOY®, and HAYNES® brands of alloys. In one embodiment, the combustion chamber is filled with a combustion catalyst, such as a platinum group metal (PGM) provided in the form of power, pellets, extrudates, or the like. These alloys are appropriately passivated to prevent contamination of components from off-gassing.

Inasmuch as the fuel reformer and the combustor are provided in this invention as a modular unit, the physical and thermal connections of the two units deserve attention. It should be appreciated that heat from the combustor is made available to drive the fuel reformer, for example, by direct physical conduction or by convection. Thus, the two units are positioned adjacent to each other, and preferably, in conductive, that is, direct solid-to-solid contact. One exemplary embodiment provides the fuel reformer-combustor module in the geometry of a tube. One exemplary embodiment of the tubular-shaped fuel reformer-combustor module is defined in the shell-and-tube deign illustrated in FIGS. 2 and 3 (62). The shell-and-tube design comprises two concentric tubes. In one exemplary embodiment of this invention, as illustrated in FIG. 2, the inner tube functions as the fuel reformer and the annular space between inner and outer tubes functions as the combustor. In another exemplary embodiment of this invention, as illustrated in FIG. 3, the inner tube functions as the combustor, while the annular space between the inner and outer tubes functions as the fuel reformer.

Under operating conditions the reformer is typically fed a hydrocarbon fuel comprising, for example, any gaseous hydrocarbon existing in a gaseous state at 22° C. and 1 atm pressure (101 kPa), or alternatively, any liquid hydrocarbon that is vaporizable and fed as a vapor to the reformer. Non-limiting examples of such gaseous hydrocarbons include methane, natural gas, ethane, propane, butane, biogas, and mixtures thereof. Non-limiting examples of liquid hydrocarbons that can be readily vaporized include hexane, octane, gasoline, kerosene, and diesel, biodiesels, jet propulsion fuels and synthetic fuels derived, for example, from Fisher-Tropsch processes, and mixtures thereof. Preferred fuels include methane and natural gas. If employed, the oxidant supplied to the reformer comprises a chemical capable of partially oxidizing the hydrocarbon fuel selectively to a gaseous reformate comprising hydrogen and carbon monoxide (syngas). Suitable oxidants include, without limitation, essentially pure molecular oxygen, mixtures of oxygen and nitrogen, such as air, and mixtures of oxygen and one or more inert gases, such as helium and argon.

During steam reforming operation, the quantities of steam and fuel supplied to the reformer are best described in terms of a steam to carbon ratio (St/C), which is defined as a ratio of number of moles of steam provided per atom of carbon provided. Generally, the St/C ratio is greater than about 2.5:1 and less than about 4.5:1. Typically, no oxidant is supplied during steam reforming; however, some oxidant may be supplied during steam reforming if desired. The quantities of fuel and oxidant supplied during steam reforming are best described in terms of an O:C ratio, wherein "O" refers to atoms of oxygen in the oxidant and "C" refers to atoms of carbon in the fuel. Generally, the O:C ratio of oxidant to fuel fed under steam reforming conditions ranges from 0:1 to about 0.5:1.

During CPDX and ATR reforming, supplies of fuel and oxidant are fed to the reformer in a "fuel-rich" ratio, such that there is insufficient amount of oxidant present to convert all of the fuel to complete oxidation products, namely, carbon dioxide and water. Generally, the O:C ratio of oxidant to fuel fed during CPDX and ATR operation is greater than about 0.7:1 and less than about 1.3:1. Under ATR operation water or steam is also provided, albeit in a quantity less than would be provided for steam reforming. Accordingly, the steam to carbon ratio (St/C) during autothermal reforming is typically greater than 0:1 and less than about 1.5:1.

The fuel reformer operates at a temperature greater than about 500° C. and less than about 1,100° C. A suitable weight hourly space velocity measured at 21° C. and 1 atm (101 kPa) ranges from 100 liters of combined flow of hydrocarbon fuel, steam, and oxidant per hour per gram catalyst (100 L/hr-g-cat) to about 6,000 L/hr-g-cat, which allows for high throughput. The corresponding gas hourly space velocity measured at 21° C. and 1 atm (101 kPa) ranges from about 1,500 liters of combined flow of hydrocarbon fuel, steam, and oxidant per hour per liter catalyst (1,500 hr$^{-1}$) to about 100,000 hr$^{-1}$. A reforming efficiency of greater than about 75 percent and, preferably, greater than about 80 percent is achievable relative to the LHV of the hydrocarbon fuel fed to the reformer. The reformer is capable of operating for greater than about 1,000 hours without indications of coke production and catalyst deactivation.

Under operating conditions, the combustor is fed a mixture of an oxidant and a hydrocarbon fuel and/or anode tail gas, and ignition is provided to initiate combustion. The hydrocarbon fuel and oxidant are selected from any of those identified hereinabove for use with the reformer, with methane or natural gas being the preferred hydrocarbon fuel and air being the preferred oxidant for the combustor. The combustor is operated under stoichiometric or preferably "fuel-lean" conditions, namely, at an O/C ratio equal to or preferably exceeding a ratio required to convert all carbon and hydrogen atoms in the fuel to carbon dioxide and water.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A thermally integrated solid oxide fuel cell system comprising:
   (a) a solid oxide fuel cell stack disposed within a stack hotbox;
   (b) a heat extractor disposed within the stack hotbox in thermal communication and in the absence of direct fluid communication with the fuel cell stack, the heat extractor comprising a flow path from an inlet to an outlet, the flow path of the heat extractor being circumscribed around a full or partial perimeter of the fuel cell stack;
   (c) a fuel reformer-combustor module disposed within the stack hotbox in thermal communication with the fuel cell stack, the module being circumscribed around a full or partial perimeter of the flow path of the heat extractor;
   (d) a manifold providing fluid communication from the outlet of the heat extractor to an inlet of a fuel reformer section of the fuel reformer-combustor module.

2. The solid oxide fuel cell system of claim 1 wherein the fuel reformer-combustor module is provided in a tubular shape.

3. The solid oxide fuel cell system of claim 2 wherein the heat extractor is provided in a tubular shape and disposed around the full perimeter of the solid oxide fuel cell stack.

4. The solid oxide fuel cell system of claim 3 wherein the fuel reformer-combustor module is provided in a tubular shape and disposed around a full perimeter of the heat extractor.

5. A thermally-integrated solid oxide fuel cell system comprising:
(a) a solid oxide fuel cell stack disposed within a stack hotbox;
(b) one or more heat extractor tubes disposed within the stack hotbox in thermal communication and in the absence of direct fluid communication with the fuel cell stack, the one or more heat extractor tubes having a flow path from an inlet to an outlet, the one or more heat extractor tubes being circumscribed around a full or partial perimeter of the fuel cell stack;
(c) a steam reformer-combustor module disposed within the stack hotbox in thermal communication with the fuel cell stack and circumscribed around a full or partial perimeter of the heat extractor tubes; the steam reformer-combustor module comprising a shell-and-tube reactor wherein a first tube having a first flow path from a first inlet to a first outlet is nested in concentric arrangement within a second tube of larger diameter having a second flow path from a second inlet to a second outlet, the second flow path comprising an annular space between an inner wall of the second tube and an outer wall of the first tube; and
(d) a manifold providing fluid communication from the outlet of the heat extractor to an inlet of a fuel reformer section of the fuel reformer-combustor module.

6. The system of claim 5 wherein the fuel reformer-combustor module further comprises: (i) the first tube (the inner tube) comprises a reforming zone defining a volume within the first tube; (ii) the second tube (the outer tube) comprises a combustion zone defining the annular space between an inner wall of the outer tube and an outer wall of the inner tube; and (iii) the manifold provides a flow path from the outlet of the one or more heat extractor tubes to the first inlet of the first tube, thereby connecting the flow path of the one or more heat extractor tubes to the reforming zone.

7. The system of claim 5 wherein the fuel reformer-combustor module further comprises: (i) the first tube (the inner tube) comprises a combustion zone defining a volume within the first tube; (ii) the second tube (the outer tube) comprises a reforming zone defining the annular space between the inner wall of the outer tube and the outer wall of the inner tube; and (iii) the manifold provides a flow path from the outlet of the one or more heat extractor tubes to the second inlet of the second tube, thereby connecting the flow path of the one or more heat extractor tubes to the reforming zone.

8. The system of claim 5 wherein a reforming catalyst is disposed within the reforming zone, the reforming catalyst comprising a mesh substrate having an ultra-short-channel-length and having a Group VIII metal supported thereon.

9. The system of claim 8 wherein the mesh substrate comprises a metal substrate, a ceramic substrate, or a cermet substrate.

10. The system of claim 8 wherein the mesh substrate has an ultra-short-channel-length ranging in length from 25 microns to 500 microns.

11. The system of claim 8 wherein the mesh substrate has from 100 to 1,000 flow channels per square centimeter.

12. The system of claim 8 wherein the mesh substrate is configured with a plurality of channels or pores having a diameter ranging from 0.25 mm to 1.0 mm with a void space greater than 60 percent up to 80 percent.

13. The system of claim 8 wherein each channel or pore has a pore size ranging from 5 to 80 pores per inch and a relative density, taken as a density of the structure divided by a density of solid parent material of the struts, ranging from 2 to 15 percent.

14. The system of claim 5 wherein the solid oxide fuel cell stack comprises a plurality of solid oxide fuel cell repeat units connected in series, wherein each solid oxide fuel cell repeat unit comprises a sandwich configuration of the following components: an anode, a solid oxide electrolyte, and a cathode.

15. The system of claim 14 wherein an outlet at the anode of the solid oxide fuel cell stack is fluidly connected to an inlet to a combustor section of the fuel reformer-combustor module.

16. The system of claim 14 wherein an outlet at the anode of the solid oxide fuel cell stack is fluidly connected to the inlet to the fuel reformer section of the fuel reformer-combustor module.

17. The system of claim 14 wherein an outlet at the anode of the solid oxide fell cell stack is fluidly connected to both an inlet to a combustor section of the fuel reformer-combustor module and the inlet to the reformer section of the fuel reformer-combustor module.

* * * * *